United States Patent
Zwiegincew et al.

(10) Patent No.: US 12,248,806 B2
(45) Date of Patent: Mar. 11, 2025

(54) POWER-EFFICIENT APPLICATION LIFECYCLE

(71) Applicant: META PLATFORMS TECHNOLOGIES, LLC, Menlo Park, CA (US)

(72) Inventors: Arthur Zwiegincew, Medina, WA (US); Jeffrey Mark Davis, Woodinville, WA (US); Sreekar Choudhary, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 632 days.

(21) Appl. No.: 17/559,547

(22) Filed: Dec. 22, 2021

(65) Prior Publication Data
US 2023/0195513 A1   Jun. 22, 2023

(51) Int. Cl.
*G06F 9/48* (2006.01)
*G06F 9/445* (2018.01)

(52) U.S. Cl.
CPC .......... *G06F 9/485* (2013.01); *G06F 9/44505* (2013.01)

(58) Field of Classification Search
CPC ...... G06F 1/329; G06F 9/4843; G06F 9/4881; G06F 9/4887; G06F 9/52; G06F 9/526; G06F 9/528
See application file for complete search history.

(56) References Cited

U.S. PATENT DOCUMENTS

| 10,733,260 | B1 * | 8/2020 | Sahl | G06F 40/14 |
| 10,911,539 | B2 * | 2/2021 | Karande | G06F 9/5016 |
| 11,256,319 | B2 | 2/2022 | Yardi et al. | |
| 11,675,415 | B2 | 6/2023 | Yardi et al. | |

(Continued)

FOREIGN PATENT DOCUMENTS

JP    2005229642 A    8/2005

OTHER PUBLICATIONS

Hattori T., et al., "Hierarchical Power Distribution and Power Management Scheme for a Single Chip Mobile Processor," 43rd ACM/IEEE Design Automation Conference, IEEE, Piscataway, NJ, USA, Jul. 24-28, 2006, pp. 292-295.

(Continued)

*Primary Examiner* — Andy Ho
(74) *Attorney, Agent, or Firm* — Potomac Law Group, PLLC; Dannon G. Allbee

(57) ABSTRACT

In one embodiment, an operating system of a computing system determines, by an application instance manager of the operating system, that a first instance corresponding to a first application is to be activated according to an instance database managed by the operating system, where the first application includes several application components, including the first instance and a presenter. The application instance manager invokes the first instance and the presenter, the presenter being managed by the first instance. The operating system determines that the presenter is configured to present data obtained by a data provider, the data provider (Continued)

being one of several application components of a second application. The data provider accesses data from a data store and populates a dataset defined by the second application. The presenter of the first application generates a user interface to present the data from the dataset defined by the second application.

20 Claims, 8 Drawing Sheets

(56) References Cited

U.S. PATENT DOCUMENTS

| | | |
|---|---|---|
| 2016/0027218 A1 | 1/2016 | Salter et al. |
| 2018/0074329 A1 | 3/2018 | Kazansky et al. |
| 2018/0125716 A1 | 5/2018 | Cho et al. |
| 2019/0064910 A1 | 2/2019 | Wang et al. |
| 2019/0094949 A1 | 3/2019 | Kurian et al. |
| 2019/0392558 A1 | 12/2019 | Pouliquen et al. |

OTHER PUBLICATIONS

International Preliminary Report on Patentability for International Application No. PCT/US2020/057900, mailed Jun. 2, 2022, 9 pages.

International Search Report and Written Opinion for International Application No. PCT/US2020/057900, mailed Mar. 5, 2021, 11 Pages.

Nathuji R., et al., "Virtual Power: Coordinated Power Management in Virtualized Enterprise Systems," Proceeding SOSP '07, ACM SOSP, Proceeding of the ACM Symposium on Operating System Principles, Association for Computing Machinery, Oct. 14-17, 2007, 14 pages.

Non-Final Office Action mailed Sep. 30, 2022 for U.S. Appl. No. 17/647,946, filed Jan. 13, 2022, 8 pages.

Notice of Allowance mailed Feb. 1, 2023 for U.S. Appl. No. 17/647,946, filed Jan. 13, 2022, 5 pages.

Office Action mailed Dec. 14, 2023 for European Patent Application No. 20812468.5, filed on Oct. 29, 2020, 10 pages.

Office Action mailed Feb. 22, 2024 for Chinese Application No. 202080080994.6, filed Oct. 29, 2020, 7 pages.

Prosecution History from U.S. Appl. No. 16/829,615, dated Mar. 25, 2020 through Oct. 12, 2021, pp. 34.

Response to office action mailed Sep. 30, 2022 for U.S. Appl. No. 17/647,946, filed Jan. 13, 2022, 8 pages.

International Search Report and Written Opinion for International Application No. PCT/US2022/053320, mailed Mar. 24, 2023, 9 pages.

Paspallis N., et al., "A Pluggable and Reconfigurable Architecture for a Context-Aware Enabling Middleware System," 18th International Conference, Nov. 9, 2008, pp. 553-570.

Wikipedia, "Model-View-Controller," Dec. 18, 2021, 4 pages, XP093031369, Retrieved from the Internet: URL: https://en.wikipedia.org/w/index.php?title=Model-view-controller&oldid=1060894015 [retrieved on Mar. 14, 2023].

* cited by examiner

POWER-EFFICIENT APPLICATION LIFECYCLE

TECHNICAL FIELD

This disclosure generally relates to an application framework used in an operating system.

BACKGROUND

Traditional operating systems may have defined application lifecycles, where processes start, the processes do work on one or more threads, and then the processes exit. In this case of traditional operating systems, the application user interface and work items do not outlive the process. Additionally, there may be power consumption concerns and privacy concerns associated with the traditional operating systems, especially in the context of an augmented reality (AR)/virtual reality (VR) device.

SUMMARY OF PARTICULAR EMBODIMENTS

Disclosed herein is an application framework consisting of an application instance manager. To address power consumption concerns and privacy concerns associated with traditional operating systems, another application framework may be used where applications may be decomposed into their respective component parts. By separating out an application to its component parts, lifecycle events may be triggered individually for each component part. Each application may define multiple "instances", "presenters", "workers", and "data providers", where each presenter, worker, and data provider may have its own lifecycle. The operating system may control the presenters and data providers of each application thereby minimizing power consumption of the device and improving privacy on an AR/VR device.

In particular embodiments, the application framework may comprise an application instance manager to handle the instances implemented by the applications. The application framework may also comprise a presentation manager to manage the presenters of the applications. The application instance manager may initially activate active instances by creating an instance host for each active instance. These instances may be used to manage one or more presenters. As an example, an instance of a messaging application may have a presenter for a login user interface (UI), a conversation view, and possibly separate presenters for each individual conversation. The presenters may also be managed by the presentation manager, which may reorganize and manage the presenters. For instance, the presentation manager may reorganize the position and layout of a presenter for display to a user wearing an AR/VR device. The decomposition of applications into separate parts enables the application framework to rearrange the presenters as needed. Additionally, other applications may access data providers of a specific category. While each application may have its own data provider, such as a data provider to manage user profiles of the respective application's userbase, each data provider may be associated with a category that can be accessed by applications of the same category that may have permission. For example, a social media application may access both its own data provider and a data provider for a messaging application. More specifically, an instance of the social media application may access both a social media data provider and a messaging application data provider. Each of the presenters of the applications may also track a state of the application. For example, a presenter displaying a newsfeed may track the state of the newsfeed such that as a user scrolls through the newsfeed, the presenter may track the position where the user is looking within the newsfeed. The combination of having both the application instance manager and presentation manager handle the instances, data providers, and presenters enables flexible interoperability between applications while also reducing power consumption.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
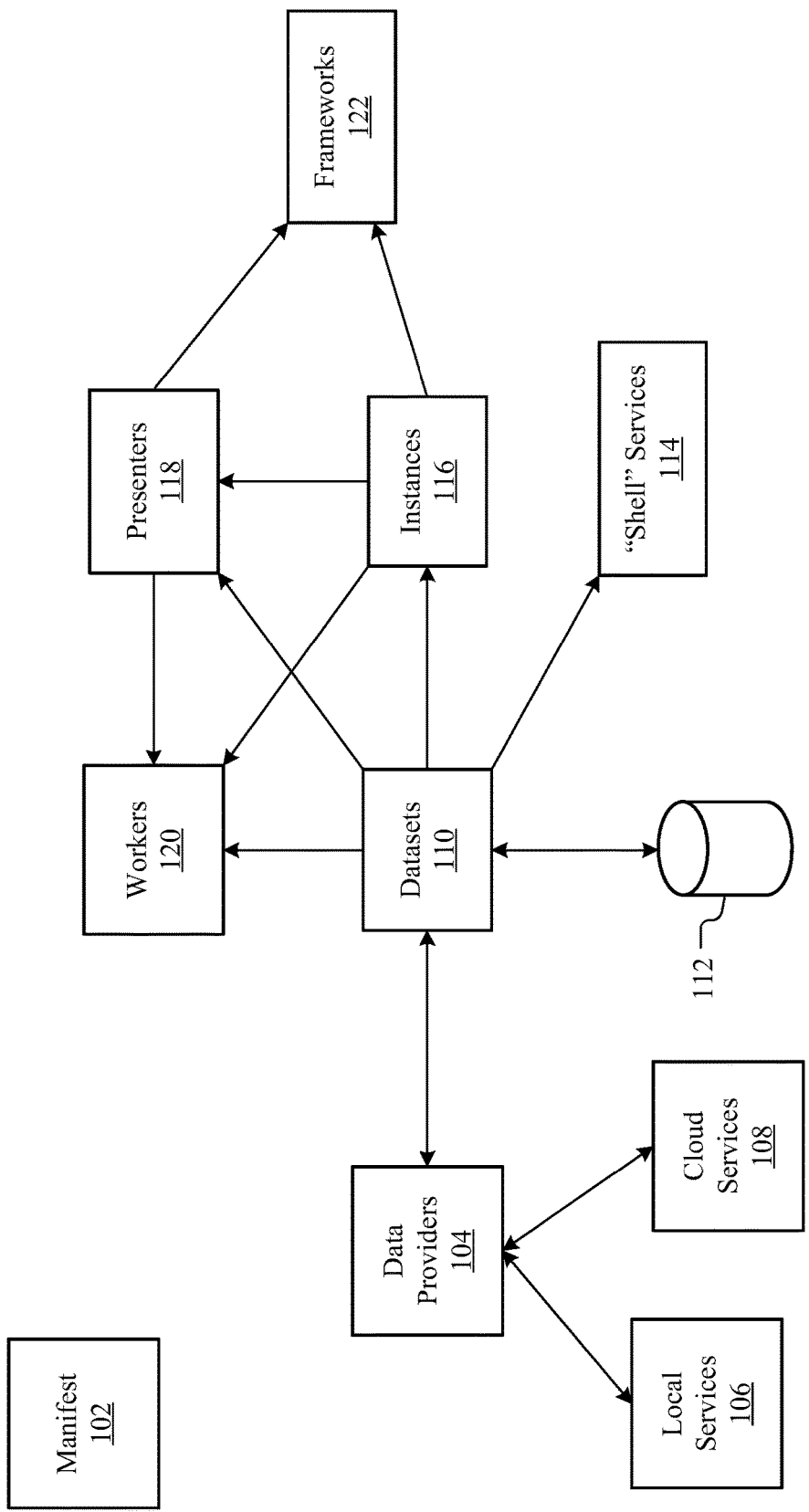
FIG. 1 illustrates an example operating system environment associated with a computing system.

In particular embodiments, an application framework may include an application instance manager. To address power consumption concerns and privacy concerns associated with traditional operating systems, another application framework may be used where applications may be decomposed into their respective component parts. By separating out an application to its component parts, lifecycle events may be triggered individually for each component part. Each application may define multiple "instances", "presenters", "workers", and "data providers", where each presenter, worker, and data provider may have its own lifecycle. The operating system may control the presenters and data providers of each application thereby minimizing power consumption of the device and improving privacy on an AR/VR device.

In particular embodiments, the application framework may comprise an application instance manager to handle the instances implemented by the applications. The application framework may also comprise a presentation manager to manage the presenters of the applications. The application instance manager may initially activate active instances by creating an instance host for each active instance. These instances may be used to manage one or more presenters. As an example, an instance of a messaging application may have a presenter for a login user interface (UI), a conversation view, and possibly separate presenters for each individual conversation. The presenters may also be managed by the presentation manager, which may reorganize and manage the presenters. For instance, the presentation manager may reorganize the position and layout of a presenter for display to a user wearing an AR/VR device. The decomposition of applications into separate parts enables the application framework to rearrange the presenters as needed. Additionally, other applications may access data providers of a specific category. While each application may have its own data provider, such as a data provider to manage user profiles of the respective application's userbase, each data provider may be associated with a category that can be accessed by applications of the same category that may have permission. For example, a social media application may access both its own data provider and a data provider for a messaging application. More specifically, an instance of the social media application may access both a social media data provider and a messaging application data provider. Each of the presenters of the applications may also track a state of the application. For example, a presenter displaying a newsfeed may track the state of the newsfeed such that as a user scrolls through the newsfeed, the presenter may track the position where the user is looking within the newsfeed. The combination of having both the application instance manager and presentation manager handle the instances, data providers, and presenters enables flexible interoperability between applications while also reducing power consumption.

As mentioned herein, certain technical challenges may exist for traditional operating systems. One technical challenge may include power consumption concerns of applications during a routine application lifecycle. The solution presented by the embodiments disclosed herein to address this challenge may be to decompose an application into component parts. By separating out an application into individual parts, the operating system may invoke only component parts that are needed for specific activities. The selective invocation of component parts may reduce the power consumption of a typical application lifecycle. As an example and not by way of limitation, if only data from an application was needed (e.g., contact data to be accessed), then only a data provider of the application may be invoked to access data from a data store and populate a dataset defined by the application. That is, a presenter of the application may not need to be invoked and save on power consumption. Another technical challenge may include privacy concerns of traditional operating systems.

Certain embodiments disclosed herein may provide one or more technical advantages. A technical advantage of the embodiments may include flexible interoperability between applications. Another technical advantage of the embodiments may include reduced power consumption. Certain embodiments disclosed herein may provide none, some, or all of the above technical advantages. One or more other technical advantages may be readily apparent to one skilled in the art in view of the figures, descriptions, and claims of the present disclosure.

In particular embodiments, an operating system of a computing system may include one or more components. In particular embodiments, the operating system may include an application instance manager, a presentation manager, and other components described herein. The operating system may use these components to manage applications. The computing system may be embodied as one or more of a smartphone, laptop, desktop, AR/VR headset, or another computing system. In particular embodiments, the operating system of the computing system may determine, using an application instance manager, that a first instance corresponding to a first application is to be activated according to an instance database managed by the operating system. In particular embodiments, the first application may comprise a plurality of application components (e.g., a presenter, an instance, a data provider, a worker, and the like). Although this disclosure describes determining that an instance corresponding to an application is to be activated in a particular manner, this disclosure contemplates determining that an instance corresponding to an application is to be activated in any suitable manner.

In particular embodiments, the operating system of the computing system may invoke a first instance and a first presenter. In particular embodiments, the operating system may use an application instance manager to invoke a first instance, where the first instance may manage the first presenter. In particular embodiments, the application instance manager may invoke one or more other instances, each of the instances may manage a respective presenter. In particular embodiments, the operating system may use the application instance manager to determine that a second instance corresponding to a second application is to be activated according to the instance database. The operating system may use the application instance manager to invoke the second instance and its corresponding components, such as a data provider. In particular embodiments, one or more instances may be invoked in parallel. The operating system may use the instance database and application instance manager to determine whether an instance needs to be invoked and/or shut down. If the application instance manager determines to shut down an instance, the application instance manager may shut down an instance while allowing other components of an application to continue running. As an example and not by way of limitation, the application instance manager may shut down an instance of an application, but a data provider of the application may continue to run after the instance is shut down. Although this disclosure describes invoking an instance in a particular manner, this disclosure contemplates invoking an instance in any suitable manner.

In particular embodiments, the operating system of the computing system may determine that a first presenter is configured to present data obtained by a data provider. In particular embodiments, the data provider may be one of a plurality of application components of a second application. As an example and not by way of limitation, the application may include a data provider, an instance, a worker, a presenter, and other application components. Although this disclosure describes determining a presenter is configured to present data in a particular manner, this disclosure contemplates determining a presenter is configured to present data in any suitable manner.

In particular embodiments, the operating system of the computing system may access data from a data store using a data provider. In particular embodiments, the operating system of the computing system may use the data provider to access data from a data store and populate a dataset defined by a second application. In particular embodiments, the operating system may use the data provider to access data from a second data store and populate the dataset defined by the second application. As an example and not by way of limitation, the data provider may access data of a certain category to populate the dataset defined by the second application. The operating system may identify data stores associated with the certain category and use the data provider to access the identified data stores. Although this disclosure describes accessing data from a data store in a particular manner, this disclosure contemplates accessing data from a data store in any suitable manner.

In particular embodiments, the operating system of the computing system may generate a user interface to present the data from the dataset defined by the second application. In particular embodiments, the operating system of the computing system may use the first presenter of the first application to generate a user interface to present the data from the dataset defined by the second application. In particular embodiments, the one or more instances may be used to manage one or more presenters to present data from one or more data providers in one or more user interfaces. As an example and not by way of limitation, the operating system may use one or more instances to manage one or more presenters to present data from one or more data providers in one or more user interfaces. In particular embodiments, the operating system may use a presentation manager to arrange one or more user interfaces based on predefined settings and user settings. As an example and not by way of limitation, a user may define a viewing space and where to place one or more user interfaces corresponding to different applications and the operating system. In particular embodiments, the operating system may use the presentation manager to close one of the one or more user interfaces based on predefined settings and user settings. Although this disclosure describes generating a user interface in a particular manner, this disclosure contemplates generating a user interface in any suitable manner.

Referring to FIG. 1, an example operating system environment 100 associated with a computing system is shown. In particular embodiments, the example operating system environment 100 may include an application decomposed into component parts. In particular embodiments, the operating system environment 100 may comprise an application manifest 102, one or more data providers 104, one or more local services 106, one or more cloud services 108, one or more datasets 110, one or more databases 112, one or more shell services 114, one or more instances 116, one or more presenters 118, one or more workers 120, and one or more frameworks. Although a particular number and configuration of component parts of the environment 100 is shown, this disclosure contemplates different configurations of the component parts including additional or removal of parts. As an example and not by way of limitation, workers 120 may be coupled to the frameworks 122. Different components of the environment 100 may serve as a client, while other components of the environment may serve as a server. In particular embodiments, instances 116 may serve as a client, where presenters 118, workers 120, and frameworks 122 are servers. In particular embodiments, presenters 118 may serve as a client, where workers 120 and frameworks 122 serve as a server. In particular embodiments, the datasets 110 may be a source and shell services 114, instances 116, and presenters 118, and workers 120 may be sinks. While connections between certain components are shown in a particular manner, the connections may be replaced with different connections. As an example and not by way of limitation, workers 120 may be a client and instances 116 may be a server. In particular embodiments, datasets 110 may be a developer-defined managed entity. As an example and not by way of limitation, the datasets 110 may be managed and defined by a developer of an application. In particular embodiments, data providers 104, instances 116, presenters 118, and workers 120 may be developer-defined roles. As an example and not by way of limitation, the data providers 104, instances 116, presenters 118, and workers 120 may be roles defined by a developer of an application. In particular embodiments, shell services 114 and frameworks 122 may be system components of the operating system. In particular embodiments, the application manifest 102 may be embodied as application metadata needed by different parts of the system. In particular embodiments, the application manifest 102 may be an entry point into the application and may be a declarative entity that is common across all applications. In particular embodiments, the application manifest 102 may be an enumeration of one or more implemented types of instances, presenters, workers, and data providers and their required parameters. In particular embodiments, the application manifest 102 may be a specification of required capabilities for each of the instances, presenters, workers, and data providers.

In particular embodiments, datasets 110 may be sources of data in the operating system. The read side of a dataset 110 may be a declarative query (e.g., SQL queries) and may allow the operating system to control the lifecycle of downstream roles based on data updates. The write side of a dataset 110 from the perspective of downstream consumers may be a set of mutation methods. Datasets 110 may enable the operating system to reason about data flow and apply declarative patterns throughout. As an example and not by way of limitation, in the interest feed, the existence of augment instances can be declaratively tied to the presence of a data item in a dataset 110. The datasets 110 may need to conform to a dataset model specific to the application framework described herein. In particular embodiments, datasets 110 may be embodied as one or more of an interest feed, set of contacts, calendar, application specific datasets, tracker/recognizer sets (e.g., the set of empty walls nearby), and system state dataset.

In particular embodiments, data providers 104 may be code behind datasets 110. In particular embodiments, Data providers 104 and datasets 110 may have a 1:N relationship. In particular embodiments, data providers 104 may populate datasets 110 and keep them up-to-date. As an example and not by way of limitation, data providers 104 may sync the datasets 110 with cloud sources. Data providers 104 may be configured to implement mutations on datasets 110. In particular embodiments, data providers 104 may run in the background and/or run when datasets 110 are consumed by active instances 116, presenters 118, and workers 120. In particular embodiments, only data providers 104 use a specific cloud data pipeline may run in the background and other data providers 104 may run only when datasets are consumed by active instances 116, presenters 118, and workers 120. In particular embodiments, data providers 104 may be embodied as one or more of a cloud storage provider, face tracker/recognizer, assistant, microphone, local key value (KV) store, local filesystem, an application data provider, and the like. Other embodiments of data providers 104 may be considered.

In particular embodiments, workers 120 may be arbitrary non-user interface processes that may be needed for instances 116 and presenters 118 to function. Workers 120 may provide an escape hatch. The workers 120 may provide security bulkheads for different internal parts of an application that may not be related to user interaction. In particular embodiments, a worker 120 may be embodied as one or more of a raytracing rendered for a 3D modeling app, chess engine in a chess engine, and the like. Other embodiments of workers 120 may be considered.

In particular embodiments, instances 116 may manage the state and lifecycle of an application instance. The instances 116 may switch among available presenters 118 based on dataset 110, worker 120, and presenter 118 state changes. In particular embodiments, instances 116 may have different privilege levels. Instances 116 with higher privilege levels may create additional instances of various types. In particular embodiments, instances 116 may manage serialization of an application state. In particular embodiments, instances 116 may be restricted to have no network access, have no user interface, and have no storage other than mediated access. Special permissions for particular instances 116 may be required to create additional instances 116 and to be always active. These special permissions may be assigned by an administrator.

In particular embodiments, presenters 118 may implement graphical, voice-based, tactile, or other user interfaces. In particular embodiments, presenters 118 may be hierarchically composed, allowing for various forms of cross-application integration. Presenters 118 may include metadata-based restrictions that allow the operating system to request and enforce no-distraction UIs. The operating system may kill one or more presenters 118 without a handshake. In particular embodiments, presenters 118 may have no network access. In particular embodiments, presenters 118 may have metadata-based restrictions to impose restrictions on the presenters 118 based on determined metadata. In particular embodiments, presenters 118 may be embodied as one or more of a share intent target chooser, login view, conversation view, conversation list view, photo application thumbnail view, photo application image editor, voice interface, codec, augmentation, and the like. Other embodiments of presenters 118 may be considered.

In particular embodiments, shell services 114 may include one or more of an application launcher, a context manager, a window manager, a notification manager, and the like. The shell services 114 may be a group of privileged system processes that may perform special actions. The shell services 114 may include first party services and third party services.

In particular embodiments, frameworks 122 may include libraries of the operating system. In particular embodiments, frameworks 122 may include system services that provide functionality such as UI rendering, audio, and the like.

In particular embodiments, the one or more components of environment 100 may run concurrently. Each role (e.g., data provider 104, instance 114, presenter 118, and worker 120) of the environment 100 may be implemented purely declaratively, through a virtual machine, and through native processes. Some components of the environment 100 may be running in the cloud, while other may be running on the computing system. As an example and not by way of limitation, data providers 104 and workers 120 may be running in the cloud.

Figure 2:
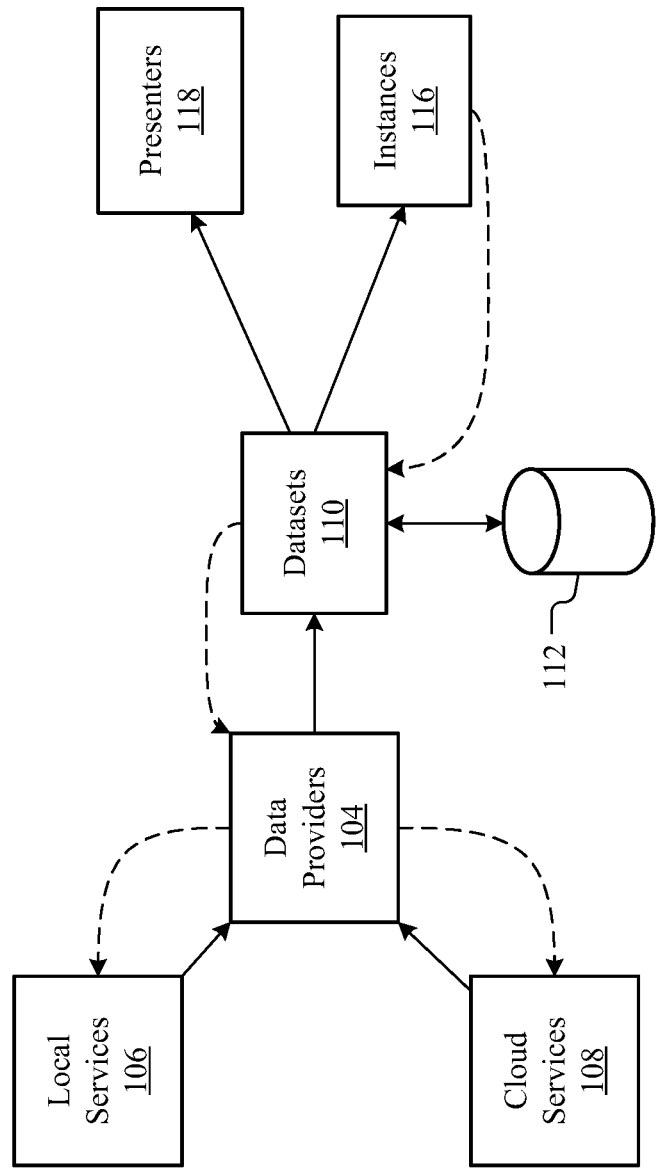
FIG. 2 illustrates another example operating system environment associated with a computing system.

Referring to FIG. 2, another example operating system environment 200 associated with a computing system is shown. The operating system environment 200 may have similar components of operating system environment 100. In particular embodiments, the operating system environment 200 may include one or more data providers, one or more local services 106, one or more cloud services 108, one or more datasets 110, one or more datastores 112, one or more instances 116, and one or more presenters 118. The components of environment 200 may function similarly to the same components of environment 100. While a particular configuration and number of components of environment 200 is shown, this disclosure contemplates any suitable configuration and different number of components of environment 200. As an example and not by way of limitation, there may be two or more data stores 112. In particular embodiments, data may flow from one or more local services 106 and one or more cloud services 108 to the one or more data providers 104. As an example and not by way of limitation, the operating system environment 100 may access, determine, or capture data using one or more local services 106 and/or one or more cloud services 108. The one or more local services 106 and/or one or more cloud services 108 may send the data to the one or more data providers 104. The one or more data providers 104 may access data from one or more data stores 112 and populate the one or more datasets 110. The one or more datasets 110 may send data to the one or more instances 116 and/or the one or more presenters 118. The one or more instances 116 and the one or more presenters 118 may access the data from the one or more datasets 110. In particular embodiments, the one or more instances 116 may send mutations or updates to the data to the datasets 110. The mutations may be processes that change the data. In particular embodiments, the one or more data providers 104 may access any mutations of the data from the one or more datasets 110. The one or more data providers 104 may send mutations of the data to the one or more local services 106 and/or the one or more clouds services 108.

In particular embodiments, the data providers 104 may be responsible for keeping datasets 110 up-to-date and implementing one or more mutation methods. In particular embodiments, one or more data providers 104 may be started or initiated when a corresponding dataset 110 is used by an active instance 116 and/or a presenter 118. As an example and not by way of limitation, if an instance 116 or presenter 118 of an application uses data of a dataset 110, the corresponding data provider 104 may be started to populate the data in the dataset 110. In particular embodiments, the flow of data between the data sources (e.g., local services 106 and cloud services 108) and the data providers 104 may be based on a push model. In particular embodiments, the data providers 104 may use polling to retrieve data from the data sources. The operating system may provide a cloud-based pub/sub mechanism that allows first and third party cloud services to push data to topics (or logical streams) consumed by their data providers 104. In particular embodiments, the data may be delivered to the computing system via a single pipe. The single pipe may be managed by a first party entity. This pipe may act as a control plane for the data flow between the components of the operating system environment 200. In particular embodiments, the operating system environment 200 may disallow background data providers 104 from using any other pipe in order to control power usage. As an example and not by way of limitation, the data providers 104 may not be allowed to run in the background based on a privilege level of the data providers 104. In particular embodiments, for incoming data from cloud services 108, the data may be logged and left until a corresponding data provider 104 is activated by a by a downstream client or the data provider 104 may be activated to update the dataset 110 (e.g., a local dataset 110) corresponding to the data in response to detecting the incoming data. The method of addressing incoming data may be based on the respective application corresponding to the datasets 110 and data providers 104. As an example and not by way of limitation, a first application may log incoming data while a second application may activate a data provider 104 to update the dataset 110.

In particular embodiments, declarative data providers may be pure schemas with mutations derived from the schemas. In particular embodiments, any mutable property may be changed by a mutation and any entity type may be created or deleted. In particular embodiments, declarative data providers may be tied to cloud datasets, which may be single user cloud datasets or shared cloud datasets. As an example and not by way of limitation, a chess application may define a shared dataset representing the chess board and a move history. The chess application may use a network control plane to establish a session with a globally unique identifier and an access token. Any instance connected to the session would observe the same dataset. Mutations against the shared declarative datasets may use a set of predicates specifying assumptions made by a caller. This may prevent conflicts from arising in the data. As an example and not by way of limitation, the transaction that changes the position of the board and appends a move to the move history would be predicated on the size of the move history corresponding to the state when the move was made.

In particular embodiments, the dataset 110 may be a collection of schematized data. In particular embodiments, the dataset 110 may be a rooted bound object graph. By having the dataset 110 bound, the dataset 110 may be a source of live data so any updates after the initial read may automatically be propagated through the other components of the operating system environment 200. In particular embodiments, the root value of bound variables of the bound object graph may typically contain a number of collections of scalars, structs, enums options, collections, and hierarchies, which may be similar to tables. In particular embodiments, the datasets 110 may expose a group of arbitrary mutation methods, which may be specific to dataset 110 type. In particular embodiments, the datasets 110 may drive instance 116 and presenter 118 bring-up and lifetime. As an example and not by way of limitation, the interest feed may contain a dataset 110 representing the set of augments that are relevant to the user. Each of these augments may be mapped to a new instance 116 automatically, via the dataset 110. This ability to specify a query against one or more datasets 110 and to tell the operating system to treat the result as a set of instances 116 may be a built-in feature of the operating system. The datasets 110 may be integral to application composition. Schematized data may be important for application-to-application interaction. As an example and not by way of limitation, the user might give access to their calendar to a specific application. The interaction between that application and a calendar application is via data exchange and method invocations about meeting instances, free/busy times, etc. These interactions may require permissions, and because everything is expressed in terms of a common data model, the permissions can be given at different levels of fidelity. As an example and not by way of limitation, an application might get access to free/busy times instead of full event details. The permissions might preclude performing any mutations (or changes to the data) other than creating new meetings in previously free times.

In particular embodiments, the data may reside in the one or more different locations. In particular embodiments, the data may reside in a cloud, internal service state, custom internal store, etc., which may be external to the operating system environment 200. In particular embodiments, for external data, the data provider 104 may be configured to expose a bound object graph. The data provider 104 may accomplish this by temporarily putting a modest amount of data in a bound variable. In particular embodiments a data provider 104 may be coded directly to a bound object graph protocol. In particular embodiments, the data may be cached in a local dataset 110 store. In particular embodiments, for a local dataset 110, a data provider 104 may use the system dataset 110 store for a cache. The dataset 110 may implement the full bound object graph protocol, but exposes working set management features. In particular embodiments, the data may be fully stored in a local dataset 110 store (e.g., data store 112). The data provider 104 may sync an entire dataset 110. As an example and not by way of limitation, a data provider 104 may sync individual documents, music application playlists, and the like. The data may reside in the data store 112 based on a operating system KV store.

In particular embodiments, datasets 110 may specify various traits. As an example and not by way of limitation, datasets 110 may participate in a search. In particular embodiments, a dataset 110 may provide a view of the data that's accessible to search. In particular embodiments, when an external or cached dataset 110 may be involved in a search, a method may be required to access the data, such as allowing a cloud service 108 to participate in the request.

In particular embodiments, there may be an instance 116 for each running application. In particular embodiments, instances may be units of application activity. In particular embodiments, the instances may be active or inactive. In particular embodiments, an inactive instance may be data in persistent storage. An active instance 116 may have an observable user interface, such as one or more running presenters 118. In particular embodiments, only a privileged component may have permissions to change an active state of an arbitrary instance. In particular embodiments, an instance may create other instances, and then the creating instance may change the active state of the created instances (e.g., deactivating the created instances).

In particular embodiments, each instance 116 may have a type. Instance types may be defined by individual applications. The instance type may determine the schema for the instance state. As an example and not by way of limitation, a web browser instance may have the document URL as its state. In particular embodiments, the presenters 118 may have a state. As an example and not by way of limitation, for a web browser, the states of the presenter 118 may include a size of the window, a scroll position, a current selection, and values in web forms, and the like. In particular embodiments, the instance schema may contain additional properties with default values. As an example and not by way of limitation, the state can default to an initial state. In particular embodiments, each instance 116 may manage one or more presenters 118. As an example and not by way of limitation, an instance 116 may be tied to a specific single presenter 118, which may fuse them into a single entity. As another example and not by way of limitation, an application can be modularized which an instance 116 managing multiple presenters 118. As an example and not by way of limitation, a messaging application may start in a logged-out state. In the logged-out state, the messaging application may present a login UI using an instance 116 and a presenter 118.

Once the credentials are retrieved, the messaging application would transition the state to a conversation view, which would be a separate presenter 118. In the case that a user is able to open individual conversations in separate windows, each individual conversation may use a separate presenter 118.

In particular embodiments, instances 116 may be created in multiple ways. In particular embodiments, the operation to create instances 116 may require a higher privilege level of permissions. In particular embodiments, a system application launcher may start applications by writing directly into a system instance dataset. The application manifest's instance type declaration will include one or more instance templates. These templates may be used as an initial value of an instance entity to be inserted into the system instance dataset. In particular embodiments, each template could have independent icons and labels. In particular embodiments, instance templates may specify parameters. As an example and not by way of limitation, an augment template may require a specific type of anchor before it can be instantiated. This information may be used by the system application launcher to determine what augments can be instantiated in a specific situation. The templates can include other placement metadata. As an example and not by way of limitation, a wall art augment may require a blank wall of a given minimum dimension. In particular embodiments, parts of a desktop manager (e.g., shell) may create instances. As an example and not by way of limitation, a user may activate a "rewind" feature, which would allow the user to see the workspace at a particular time in the past. This would temporarily create a corresponding instance by copying them out of a history database. As another example and not by way of limitation, a collaboration session tied to an assistant system call may allow a user to bring augments into a shared space, which would synchronize the set of instances within that space.

In particular embodiments, a special registered instance may spawn an instance in response to an assistant system command. As an example and not by way of limitation, a kitchen timer application may need to be "always running". This may be accomplished by registering a global instance with the computing system. The global instance may supply an ontology model to an assistant system and may be triggered when the user issues matching requests. As an example and not by way of limitation, the user may say "start a 12 miner timer for eggs", the registered instance would receive a message such as CreateTimer(12 [min], "eggs") based on the ontology. The registered instance may process the input by either creating a new instance for the timer or adding an internal time entity to the existing dataset.

In particular embodiments, instances 116 may have interactions with other roles of the operating system environment 200. In particular embodiments, datasets 110 may expose data that affects the state of an instance. As an example and not by way of limitation, if a cloud identity provider indicates a user has been logged out, an instance 116 may create an additional presenter 118 with the login UI. As another example and not by way of limitation, if a system-wide user state dataset indicates that a user is in the no-visual-obstruction mode, the instance may transition away from all presenters 118 that invoke visual UI services. System-wide state may include features such as low-power mode, noisy environment, user in deep focus, and the like. In particular embodiments, instances 116 may start and stop presenters 118, possibly passing data and worker references to the presenters 118. For declarative instances 116, the instance 116 and presenter 118 interaction may take the form of a presenter invocation template. For programmatic instances 116, the instance 116 and presenter 118 interaction may take the form of a Rosetta component tree retention, where the presenter 118 may play the role of a server, where each presenter 118 may be a root component. In particular embodiments, instances 116 may terminate themselves. Declarative instances 116 may transition the state machine to a terminated state. Imperative instances 116 may raise a root component one-shot event called terminate. In particular embodiments, presenters 118 may send events to instances 116. These events may be intended to drive the state of the instance 116. As an example and not by way of limitation, a login UI presenter 118 may send an event indicating that credentials have been acquired. The UI may not and may not need to know what the application is going to do next, but rather it merely sends an event. The instance 116 may use this event to transition itself into the appropriate new state. As an example and not by way of limitation, instantiate another presenter 118 corresponding to the new state.

In particular embodiments, instance 116 may be deactivated in situations such as the computing system going to sleep or the user switching to an overlay/space that doesn't include the given instance. When the computing system decides to deactivate an instance 116, a one or more of a series of steps may occur. In particular embodiments, all user-observable state of the instances' 116 presenters 118 may be terminated. This may mean sounds may stop playing, and UI disappears. The instance 116 may define a deactivation transition using a transition presenter 118 supplied by the instance 116 for this occasion. The computing system may have a policy on a maximum duration of deactivation transitions. In particular embodiments, declarative instances 116 may flush the write-ahead log storing their internal state and the defining state for their presenters 118. The presenters 118 may be terminated immediately without any events for declarative instances 116. In particular embodiments, imperative instances 116 may be signaled a deactivation method via their top level component. The method response may be the serializable state of the instance 116. The instances 116 may be given a short period of time to do cleanup that is necessary and respond, after which, if the instances 116 do not exit, the process/script may be terminated forcefully.

In particular embodiments, registered instances 116 may be global singletons responsible for creating and possibly terminating instances 116 of another type within the same application domain. As an example and not by way of limitation, one or more use cases may include adding assistant system "skills", additional interest feeds, and providing "shell extensions". In particular embodiments, most applications may not be expected to include registered instances 116. Registering an instance 116 may require a special permission from the user and from a third-party entity managing the operating system via a certificate. In particular embodiments, registered instances 116 may be declarative.

In particular embodiments, presenters 118 may be responsible for putting up observable user interfaces (UI). Presenters 118 may include visual outputs, audio outputs, tactile outputs, and the like. As an example and not by way of limitation, presenters 118 may include visual presenters 118, speech presenters 118, tactile presenters 118, etc. In particular embodiments, presenters 118 may be declarative or imperative. The declarative presenters 118 may take the form of a type of template. The imperative presenters 118 may be launched as servers implementing a specific presenter 118 component type invoked by an instance 116. As an example and not by way of limitation, a conversation view presenter component type in a messaging application. In particular embodiments, these invocations may contain a number of immutable or bound parameters. In particular embodiments, a present 118 may be a client of a number of system and framework services, including datasets 110 and workers 120 passed in by an instance 116. In particular embodiments, visual presenters 118 may invoke the UI framework. In particular embodiments, presenters 118 may get their data and other inputs by binding to datasets 110 directly. In particular embodiments, presenters 118 may be the only role permitted to interact with UI services. In particular embodiments, the presenters 118 may be terminated at will by the computing system. As an example and not by way of limitation, when the user starts driving, the computing system may detect that the user is driving and immediately terminate all visual presenters 118. In particular embodiments, the presenters 118 may have a persistent state. As an example and not by way of limitation, when a user stops driving, the computing system may allow the UI to be brought back up in the exact same state it was in before the user started driving. In particular embodiments, the states may include a presenter-defining state stored in the data store 112. The presenter-defining state may be embodied as bound variables. Any mutations to the presenter-defining state may be automatically journaled and flushed before any termination takes place. The values may be restored when the presenter 118 is reinvoked. The reinvocation may be based on hierarchical IDs that start with the instance ID.

In particular embodiments, transition presenters 118 may be responsible for providing smooth transitions when an instance 116 switches presenters 118. In particular embodiments, the transition presenters 118 may be included with the presenters 118 or be a separate group of presenters. In particular embodiments, the transition presenters 118 may be used when a transition shows an initial presenter 118 (activation transition) and when the transition hides the last presenter 118 or terminates the presenter 118 (deactivation transition). In particular embodiments, the transition presenters 118 may be applied to particular before and after presenter type. The transition presenters 118 may access data corresponding to the context of the computing system. The context may include metadata of the computing system. As an example and not by way of limitation, the computing system may use one or more sensors of the computing system, metadata of one or more application, or metadata of the computing system to determine a context of the computing system. As an example and not by way of limitation, the computing system may use a GPS sensor to determine the user of the computing system is currently driving. In particular embodiments, during the transition, the before and after presenters 118 may be live and updating to allow for any existing animations or bound values to continue to affect the visuals. In particular embodiments, the audio may be cross-faded. In particular embodiments, transitions may happen on a fixed timescale, which may be defined by system policy or settings. As an example and not by way of limitation, the timescale may be on the order of 500 ms. In particular embodiments, the system may have an accessibility preference that may disable most transitions.

Figure 3:
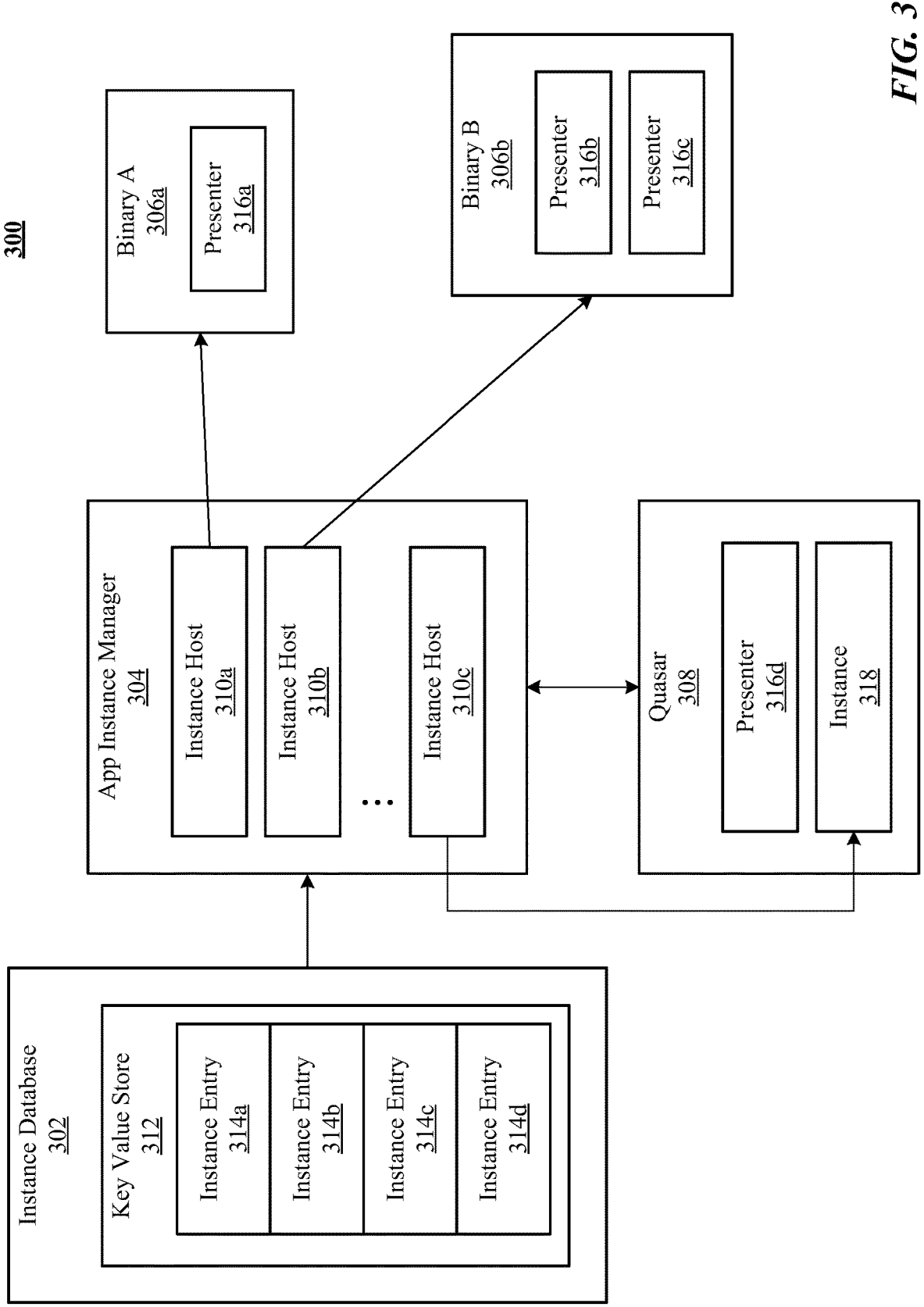
FIG. 3 illustrates an example environment of an application instance manager.

Referring to FIG. 3, an example environment 300 of an application instance manager 302 is shown. The environment 300 may include an instance database 302, an application instance manager 304, a binary A 306*a*, a binary B 306*b*, and a quasar 308. While a particular configuration and number of components of environment 300 is shown, this disclosure contemplates any suitable configuration and different number of components of environment 300. As an example and not by way of limitation, there may be two or more quasars 308. In particular embodiments, the application instance manager 304 may include one or more instance hosts 310*a*-310*c*. While only three instance hosts 310*a*-310*c* are shown, there may be any number of instance hosts 310. In particular embodiments, the instance database 302 may include a key value store 312. In particular embodiments, the key value store 312 may include one or more instance entries 314*a*-314*d*. While only four instance entries 314*a*-314*d* are shown, there may be any number of instance entries 314*a*-314*d*. In particular embodiments, binary A 306*a* may include a presenter 316*a*, binary B 306*b* may include presenters 316*b*, 316*c*, and quasar 308 may include a presenter 316*d* and an instance 318.

In particular embodiments, the instance database 302 may include all registered instances in the key value store 312 as instance entries 314*a*-314*d*. In particular embodiments, each instance entry 314 may include an application package identifier and a set of arguments. As an example and not by way of limitation, the instance entry 314 may include a namespace URL, a name, and command line arguments. Whenever a new instance is to be added, the instance may be registered using the instance database 302 and added to the key value store 312 as an instance entry 314. In particular embodiments, the instance database 302 may be used as a declarative entry point for controlling active instances. The instance database 302 may send data to the application instance manager 304. The instance database 302 may push data to the application instance manager 304 or the application instance manager 304 may request data from the instance database 302. The data may include the instance entries 314 and data associated with one or more of the instance entries 314.

In particular embodiments, the application instance manager 304 may activate all active instances from the instance database 302 by creating one instance host 310 per active instance. In particular embodiments, the application instance manager 304 may manager instances using the instance host 310*a*-310*c*. The application instance manager 304 may materialize the instance database 302 by taking the active and registered instances from the instance database 302 and turn them into reality. The application instance manager 304 may also terminate any instance that should not be active. If a new instance is created in the instance database 302 in an inactive state, the application instance manager 304 may perform no action. If a new instance is created in the instance database 302 in an active state, the application instance manager 304 may create an instance host 310 for the new instance. If an instance is made inactive in the dataset, the application instance manager 304 may find the corresponding instance host 310 and terminate the instance host 310. As an example and not by way of limitation, if the instance corresponding to instance entry 314*a* is made inactive in the instance database 302, then the application instance manager 304 may find the corresponding instance host 310 and terminate the instance host 310. If an instance in the instance database 302 is made active, then the application instance manager 304 may create an instance host 310 for the instance. If an instance component of an instance host 310 exits, then the instance host 310 may be terminated and vice versa. If an application component request another application component to start, then the instance host 310 may resolve the implementation of the component against the application manifest metadata and invoke the component. In particular embodiments, the application instance manager 304 may put multiple similar non-native application components that are active in the same processes to minimize overhead. The similarity may be determined based on whether the components share a role from an application package. In particular embodiments, the application instance manager 304 may an always-on system service.

In particular embodiments, the application instance manager 304 may invoke dependent components. In particular embodiments, application components may have two distinguishing features including naming and discovery is different. In particular embodiments, the application instance manager 304 may invoke application components and coalesce them into groups sharing a process according to security constraints. These invocations may be intra-application or inter-application. In particular embodiments, the application instance manager 304 may connect and manage the lifetimes of dependent components. This may include monitoring components and restarting them as necessary. In particular embodiments, the application instance manager 304 may implement various process environments. In particular embodiments, an application management service may be used to track installed application manifest metadata and to trigger persistent/transient application store or cloud package downloads. In particular embodiments, the instance database 302 may be snapshotted upon launch, the instance hosts 310 may be created for active instances, and a reconciliation loop may be started off a mutation stream off of the snapshot.

In particular embodiments, the instance hosts 310a-310c may be an abstraction to handle the work given to an instance. In particular embodiments, the instance hosts 310a-310c may be a data structure. The instance host 310 may be created when a new active or registered instance is observed in the dataset. This may invoke the corresponding instance component.

In particular embodiments, the application instance manager 304 process entry point may be incorporated into a binary through a special library provided by the application instance manager 304. In particular embodiments, the binary A 306a and binary B 306b may manage their corresponding presenters 316a-316c.

In particular embodiments, a quasar instance 308 may be invoked. The quasar 308 may be a fairly secure virtual machine. In particular embodiments, the quasar 308 may define its own rules for process coalescing based on its security.

Figure 4:
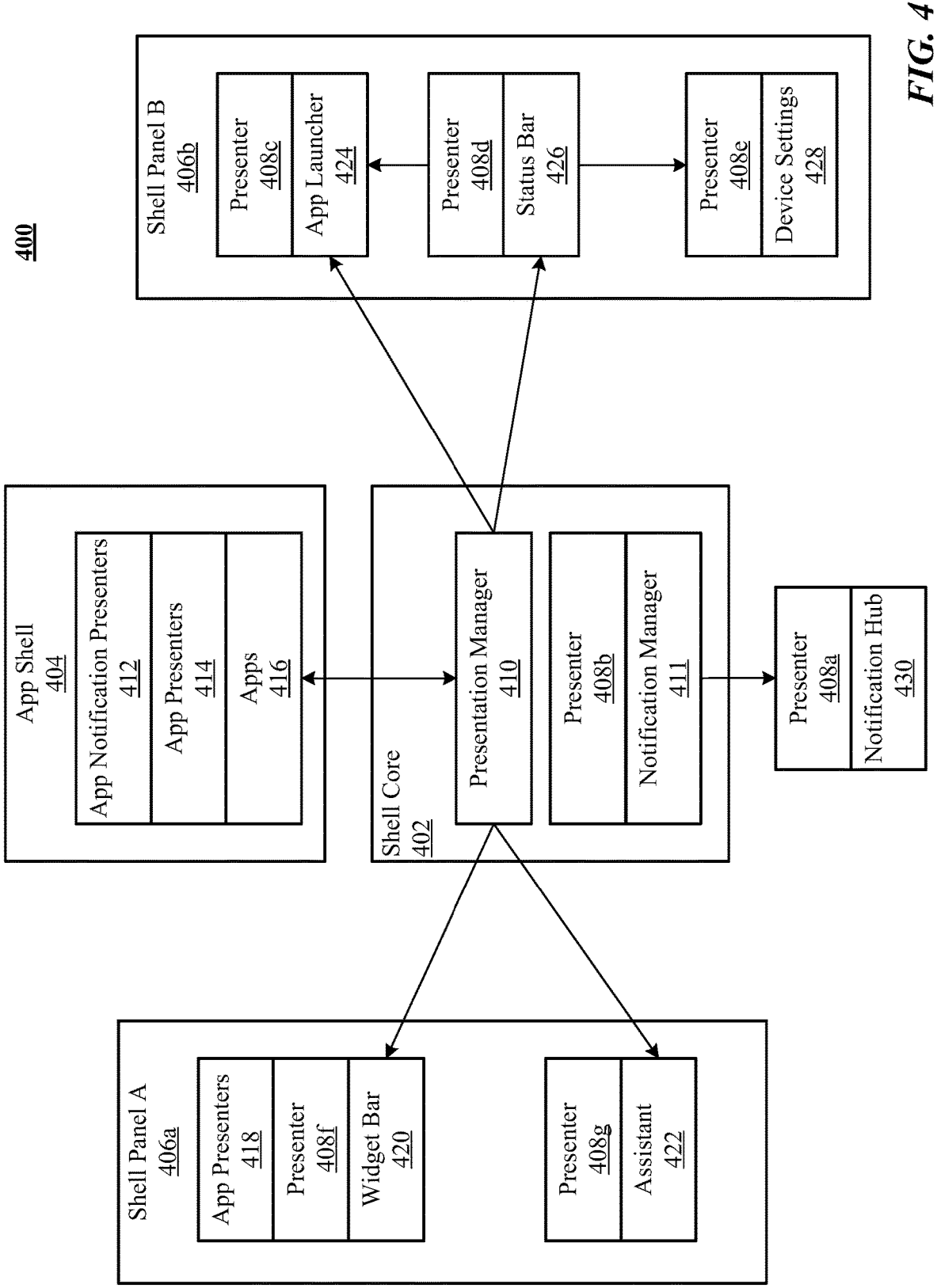
FIG. 4 illustrates an example environment of a presentation manager.

Referring to FIG. 4, an example environment 400 of a presentation manager 410 is shown. In particular embodiments, the environment 400 may include a shell core 402, an application shell 404, shell panel A 406a, shell panel B 406b, and a presenter 408a. While a particular configuration and number of components of environment 400 is shown, this disclosure contemplates any suitable configuration and different number of components of environment 400. As an example and not by way of limitation, there may be additional shell panels 406 and additional presenters 408. In particular embodiments, the shell core 402 may include a presentation manager 410, a presenter 408b, and notification manager 411. The application shell 404 may include application notification presenters 412, application presenters 414, and applications 416. The shell panel A 406a may include application presenters 418, presenter 408f, widget bar 420, presenter 408g, and assistant 422. The shell panel B 406b may include presenter 408c, application launcher 424, presenter 408d, status bar 426, presenter 408e, and device settings 428.

In particular embodiments, the presentation manager 410 may be an orchestrator of all body-spaced content around the user and may provide entry points to various shell UI panels, such as shell panel A 406a and shell panel B 406b. In particular embodiments, the presentation manager 410 may have a unique role in its ownership of the root of the actual rendered scene graph. The presentation manager 410 may splice in visible panels and augment trees into a global scene while glinting other scenes. In particular embodiments, the presentation manager 410 may enable a hands free experience while moving by applying an appropriate panel/augment layout. In particular embodiments, the presentation manager 410 may process output from the context engine to determine what is most important for the user to see and ensure that the output is visible for the user. In particular embodiments, the presentation manager 410 may manage what is visible to the user based on one or more of the user settings, user's attention, environment, and system power state. As an example and not by way of limitation, the user's attention may be determined based on a determination of the user's gaze via eye trackers. Based on where the user's gaze is identified, the presentation manager 410 may emphasize the content visible to the user based on the user's gaze. As another example and not by way of limitation, the environment may be identified as the user is located in an outdoor setting, the presentation manager 410 may make sure the user is able to see the outdoor setting while important notifications may show up when necessary. In particular embodiments, the presentation manager 410 may manage the order and position of various panels created for applications, notifications, and input surfaces. The presentation manager 410 may determine a correct overlay order for the various panels. As an example and not by way of limitation, the applications may be placed furthest away, then notifications, and finally assistant and input surfaces in the front. In particular embodiments, the presentation manager 410 may reposition application panels (e.g., shell panels A, B 406a-406b based on contextual signals. In particular embodiments, the presentation manager 410 may create a body space around the user (e.g., for a user using an augmented reality headset or a virtual reality headset) and presents entry points for accessing other modular shell UI panels like the widget bar 420, status bar 426, etc.

In particular embodiments, the presentation manager 410 may communicate with framework services and be informed when applications create content. In particular embodiments, the presentation manager 410 may receive a state from a context engine in order to define presentation based on current attention level. In particular embodiments, the presentation manager 410 may use states to launch and position applications and async UI in personal space around the user. In particular embodiments, the presentation manager 410 may reduce applications to glints when needed based on context and visual density (e.g., number of applications open). In particular embodiments, the presentation manager 410 may provide a gate around every application and allow the user to manipulate application position and size. In particular embodiments, the presentation manager 410 may provide launch points for various shell panel UI, such as an application launcher 424 and a status bar 426.

In particular embodiments, the presentation manager 410 may create a volume manager, which may participate in positioning and sizing of applications based on user settings, context, power level, and one or more modes the application supports. The one or more modes may be listed in an application's manifest. In particular embodiments, the presentation manager 410 may build and maintain the shell state. In particular embodiments, the presentation manager 410 may change overall UI density based on power state. As an example and not by way of limitation, if the computing device is determined to be in a low power state, then the presentation manager 410 may reduce the overall UI density presented to the user.

In particular embodiments, the volume manager may provide services for application and notification content to be displayed correctly in space. In particular embodiments, the volume manager may discover panels and augments retained by applications and is notified when new containers are requested by applications. In particular embodiments, the volume manager may use a Paug system to position application and shell UI panels around the user. The Paug system may work based on a scene graph and part of spatial UI. In particular embodiments, a body locked placement may be implemented for a head locked mode. In particular embodiments, the volume manager may create an internal state object for the application panels and augments and maintains state about it like the position, bounds, appearance state (glint/full), etc. The volume manager may use the states to change position, size and appearance of the application/notification correctly at launch and as shell state changes. In particular embodiments, the volume manager may update opacity of UI to emphasize the environment around the user and to visually indicate the lifetime of notifications. As an example and not by way of limitation, the volume manager may change the opacity of the UI when the user is outside so the user is able to see the user's environment. In particular embodiments, the volume manager may manage an application's positioning and placement when an application launches.

In particular embodiments, gates may allow the user to control their augmented or virtual space by deciding what is allowed in. Gates may provide a set of controls on a visible application, notification, or data object that allow the user to: close or dismiss the contents from view; reposition, resize and move from personal space to world space; change visual state such as from full to glint; gates will also facilitate drawing world applications placed in the widget bar; and highlight applications as instructed by a context processor. The presentation manager 410 may use a gate instance created by a volume manager to communicate with the component's presenter using bound variables, messages, and events through the container and privileged container API. When a gate is manipulated, adjustments to its state may be reflected in bound variables in the attached component, which present the capability to respond. As an example and not by way of limitation, if the height of the gate is reduced, an application knows to no longer draw above the cutoff and should move or remove its content if necessary. In particular embodiments, in a scenario where an application's world-space position is moved without reflow (such as translation on the same vertical surface) the application will not be informed of any state change and all repositioning will be the result of moving the underlying paug.

In particular embodiments, a context processor may interact with a context engine to access the state. The context processor may access a location and movement state of the user and changes to the user's environmental state. In particular embodiments, the environment 400 may include context signals such as Activity, Events, etc. to enable people centric scenarios. The shell state and bound variables may be updated to respond to events. The state may be used by the volume manager as described herein.

In particular embodiments, the presentation manager 410 may use power states to determine the kinds of surfaces and shell panel UI that are visible, such as a standby power state, a glance power state, and an interactive power state. The standby power state may be a state where all applications and shell launch points are not visible and the user experiences full visibility of the world and the displays are off. A notification may be shown or a tap to the computing system (e.g., a head mounted display) may send the notification to a glance mode. The glance mode may be a state where the user can quickly access information and notifications. In particular embodiments, the user may select UI or perform hand gestures to access an interactive mode. The interactive mode may be a state where a full range of capabilities of the device are available to the user. An example of an interactive mode may be shown in FIG. 5.

In particular embodiments, the presentation manager 410 may be listening for notification and application container events when the power state is in a standby state. The notification manager 411 may detect a new entry in the notification dataset query. If the user settings and context allow for notifications, then the notification manager 411 may request an instance associated with the dataset to provide a notification presenter for the entry. The application (e.g., one of applications 416) may create a notification container and the presentation manager 410 may position the notification using the Paug system and trigger a glance mode.

In particular embodiments, the presentation manager 410 may maintain a strict data boundary between the presentation manager 410 and applications 416. The presentation manager 410 may not have the capability to inspect the contents of an application and will be notified when a new content tree is created to improve security. Similarly, applications 416 may not b able to know the user's gaze or their own position in a real-world environment. The presentation manager 410 may not directly own UI and may use shell panel applications, such as the widget bar 420 to perform various operations. In particular embodiments, the presentation manager 410 may respond to systems which measure power usage on the computing system. In particular embodiments, the presentation manager 410 may adjust the run time of applications by closing and glinting application to alter the usage of system resources based on the stage power consumption.

Figure 5:
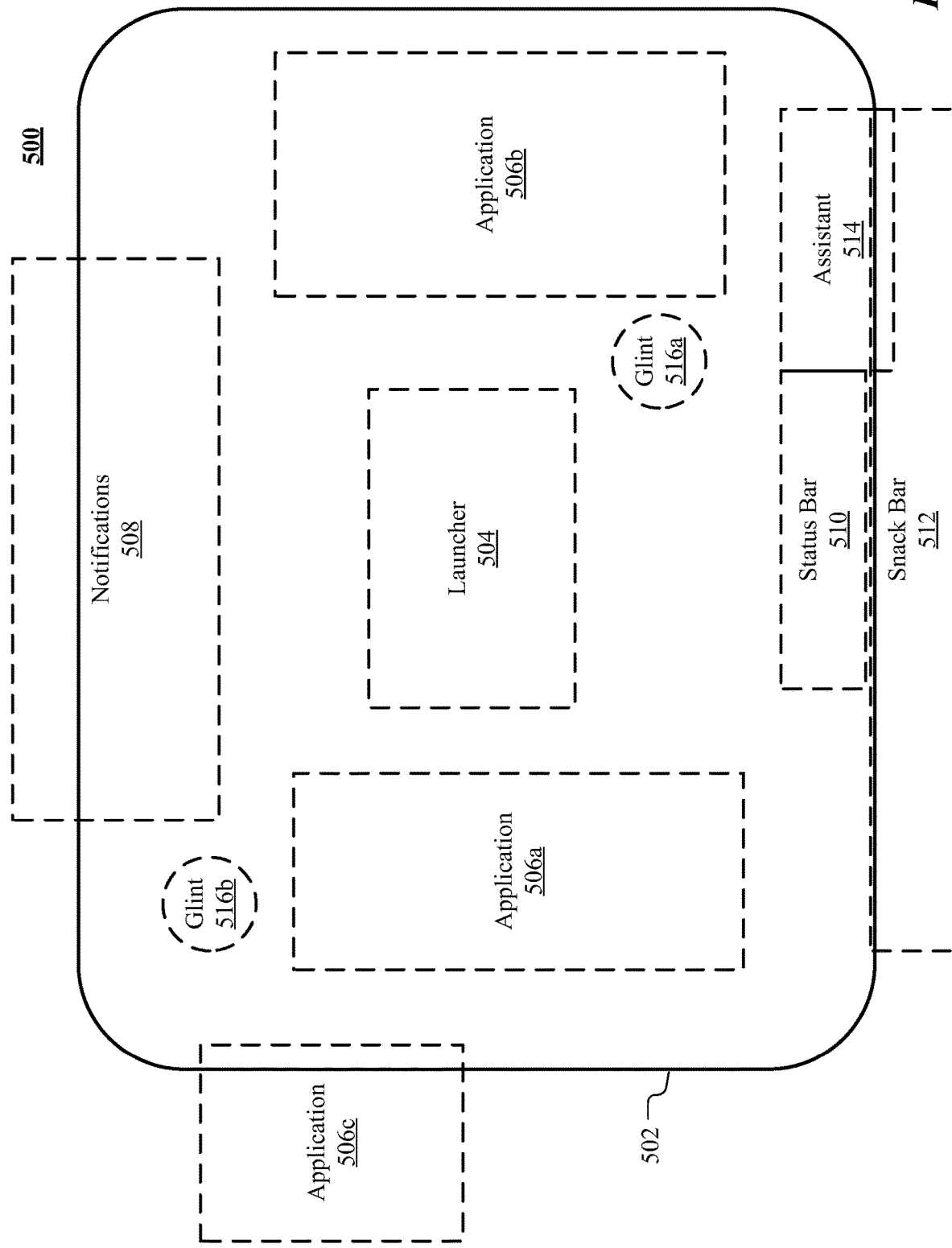
FIG. 5 illustrates an example user interface.

Referring to FIG. 5, an example user interface 500 is shown. In particular embodiments, the user interface 500 may represent an interactive mode as described herein. The user interface 500 may include a field of view 502 of a user. The field of view 502 may be what is presented to a user via a computing system (e.g., what is displayed on an augmented reality headset or virtual reality headset). The user interface 500 may include a launcher 504, applications 506a-506c, notifications 508, status bar 510, snack bar 512, assistant 514, and glints 516a-516b. While a particular configuration and number of components of user interface 500 is shown, this disclosure contemplates any suitable configuration and different number of components of user interface 500. In particular embodiments, the launcher 504 may be UI for launching applications and other UI. The applications 506a-506c may be UI or containers for applications. Notifications 508 may be a UI or a container for notifications. The status bar 510 may be a UI or a container for a status. The status may represent a minified view of an application 506. The snack bar 512 may be a UI or a container for one or more elements. The assistant 514 may be a UI or container for an assistant system which the user may invoke using a plurality of user inputs of different modalities (e.g., hand gesture, voice command, visual input, etc.). In particular embodiments, the glints 516a-516b may represent UI or containers of reduced applications or other UI.

Figure 6:
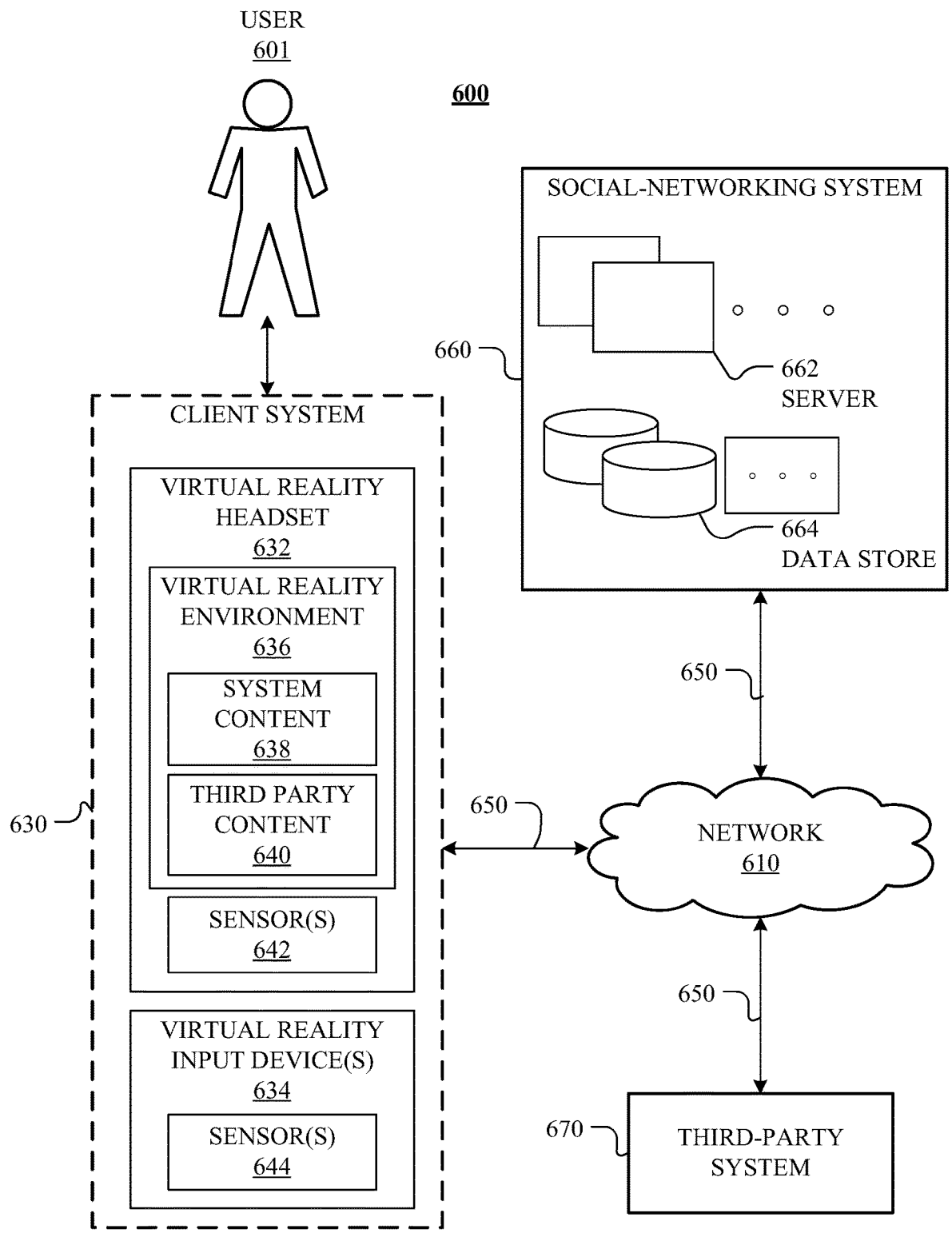
FIG. 6 illustrates an example network environment associated with a virtual reality system.

FIG. 6 illustrates an example network environment 600 associated with a virtual reality system. Network environment 600 includes a user 601 interacting with a client system 630, a social-networking system 660, and a third-party system 670 connected to each other by a network 610. Although FIG. 6 illustrates a particular arrangement of a user 601, a client system 630, a social-networking system 660, a third-party system 670, and a network 610, this disclosure contemplates any suitable arrangement of a user 601, a client system 630, a social-networking system 660, a third-party system 670, and a network 610. As an example and not by way of limitation, two or more of a user 601, a client system 630, a social-networking system 660, and a third-party system 670 may be connected to each other directly, bypassing a network 610. As another example, two or more of a client system 630, a social-networking system 660, and a third-party system 670 may be physically or logically co-located with each other in whole or in part. Moreover, although FIG. 6 illustrates a particular number of users 601, client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple users 601, client systems 630, social-networking systems 660, third-party systems 670, and networks 610.

This disclosure contemplates any suitable network 610. As an example and not by way of limitation, one or more portions of a network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 610 may include one or more networks 610.

Links 650 may connect a client system 630, a social-networking system 660, and a third-party system 670 to a communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout a network environment 600. One or more first links 650 may differ in one or more respects from one or more second links 650.

In particular embodiments, a client system 630 may be an electronic device including hardware, software, or embedded logic components or a combination of two or more such components and capable of carrying out the appropriate functionalities implemented or supported by a client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 630. A client system 630 may enable a network user at a client system 630 to access a network 610. A client system 630 may enable its user to communicate with other users at other client systems 630. A client system 630 may generate a virtual reality environment for a user to interact with content.

In particular embodiments, a client system 630 may include a virtual reality (or augmented reality) headset 632, such as OCULUS RIFT and the like, and virtual reality input device(s) 634, such as a virtual reality controller. A user at a client system 630 may wear the virtual reality headset 632 and use the virtual reality input device(s) to interact with a virtual reality environment 636 generated by the virtual reality headset 632. Although not shown, a client system 630 may also include a separate processing computer and/or any other component of a virtual reality system. A virtual reality headset 632 may generate a virtual reality environment 636, which may include system content 638 (including but not limited to the operating system), such as software or firmware updates and also include third-party content 640, such as content from applications or dynamically downloaded from the Internet (e.g., web page content). A virtual reality headset 632 may include sensor(s) 642, such as accelerometers, gyroscopes, magnetometers to generate sensor data that tracks the location of the headset device 632. The headset 632 may also include eye trackers for tracking the position of the user's eyes or their viewing directions. The client system may use data from the sensor(s) 642 to determine velocity, orientation, and gravitation forces with respect to the headset. Virtual reality input device(s) 634 may include sensor(s) 644, such as accelerometers, gyroscopes, magnetometers, and touch sensors to generate sensor data that tracks the location of the input device 634 and the positions of the user's fingers. The client system 630 may make use of outside-in tracking, in which a tracking camera (not shown) is placed external to the virtual reality headset 632 and within the line of sight of the virtual reality headset 632. In outside-in tracking, the tracking camera may track the location of the virtual reality headset 632 (e.g., by tracking one or more infrared LED markers on the virtual reality headset 632). Alternatively or additionally, the client system 630 may make use of inside-out tracking, in which a tracking camera (not shown) may be placed on or within the virtual reality headset 632 itself. In inside-out tracking, the tracking camera may capture images around it in the real world and may use the changing perspectives of the real world to determine its own position in space.

Third-party content 640 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 630 may enter a Uniform Resource Locator (URL) or other address directing a web browser to a particular server (such as server 662, or a server associated with a third-party system 670), and the web browser may generate a Hyper Text Transfer Protocol (HTTP) request and communicate the HTTP request to server. The server may accept the HTTP request and communicate to a client system 630 one or more Hyper Text Markup Language (HTML) files responsive to the HTTP request. The client system 630 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 660 may be a network-addressable computing system that can host an online social network. The social-networking system 660 may generate, store, receive, and send social-networking data, such as, for example, user-profile data, concept-profile data, social-graph information, or other suitable data related to the online social network. The social-networking system 660 may be accessed by the other components of network environment 600 either directly or via a network 610. As an example and not by way of limitation, a client system 630 may access the social-networking system 660 using a web browser of a third-party content 640, or a native application associated with the social-networking system 660 (e.g., a mobile social-networking application, a messaging application, another suitable application, or any combination thereof) either directly or via a network 610. In particular embodiments, the social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, the social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, the social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. The social-networking system 660 may provide users of the online social network the ability to communicate and interact with other users. In particular embodiments, users may join the online social network via the social-networking system 660 and then add connections (e.g., relationships) to a number of other users of the social-networking system 660 whom they want to be connected to. Herein, the term "friend" may refer to any other user of the social-networking system 660 with whom a user has formed a connection, association, or relationship via the social-networking system 660.

In particular embodiments, the social-networking system 660 may provide users with the ability to take actions on various types of items or objects, supported by the social-networking system 660. As an example and not by way of limitation, the items and objects may include groups or social networks to which users of the social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 660 or by an external system of a third-party system 670, which is separate from the social-networking system 660 and coupled to the social-networking system 660 via a network 610.

In particular embodiments, the social-networking system 660 may be capable of linking a variety of entities. As an example and not by way of limitation, the social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating the social-networking system 660. In particular embodiments, however, the social-networking system 660 and third-party systems 670 may operate in conjunction with each other to provide social-networking services to users of the social-networking system 660 or third-party systems 670. In this sense, the social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 660 also includes user-generated content objects, which may enhance a user's interactions with the social-networking system 660. User-generated content may include anything a user can add, upload, send, or "post" to the social-networking system 660. As an example and not by way of limitation, a user communicates posts to the social-networking system 660 from a client system 630. Posts may include data such as status updates or other textual data, location information, photos, videos, links, music or other similar data or media. Content may also be added to the social-networking system 660 by a third-party through a "communication channel," such as a newsfeed or stream.

In particular embodiments, the social-networking system 660 may include a variety of servers, sub-systems, programs, modules, logs, and data stores. In particular embodiments, the social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 660 may also include suitable components such as network interfaces, security mechanisms, load balancers, failover servers, management-and-network-operations consoles, other suitable components, or any suitable combination thereof. In particular embodiments, the social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 660 to one or more client systems 630 or one or more third-party systems 670 via a network 610. The web server may include a mail server or other messaging functionality for receiving and routing messages between the social-networking system 660 and one or more client systems 630. An API-request server may allow a third-party system 670 to access information from the social-networking system 660 by calling one or more APIs. An action logger may be used to receive communications from a web server about a user's actions on or off the social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from a client system 630 responsive to a request received from a client system 630. Authorization servers may be used to enforce one or more privacy settings of the users of the social-networking system 660. A privacy setting of a user determines how particular information associated with a user can be shared. The authorization server may allow users to opt in to or opt out of having their actions logged by the social-networking system 660 or shared with other systems (e.g., a third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
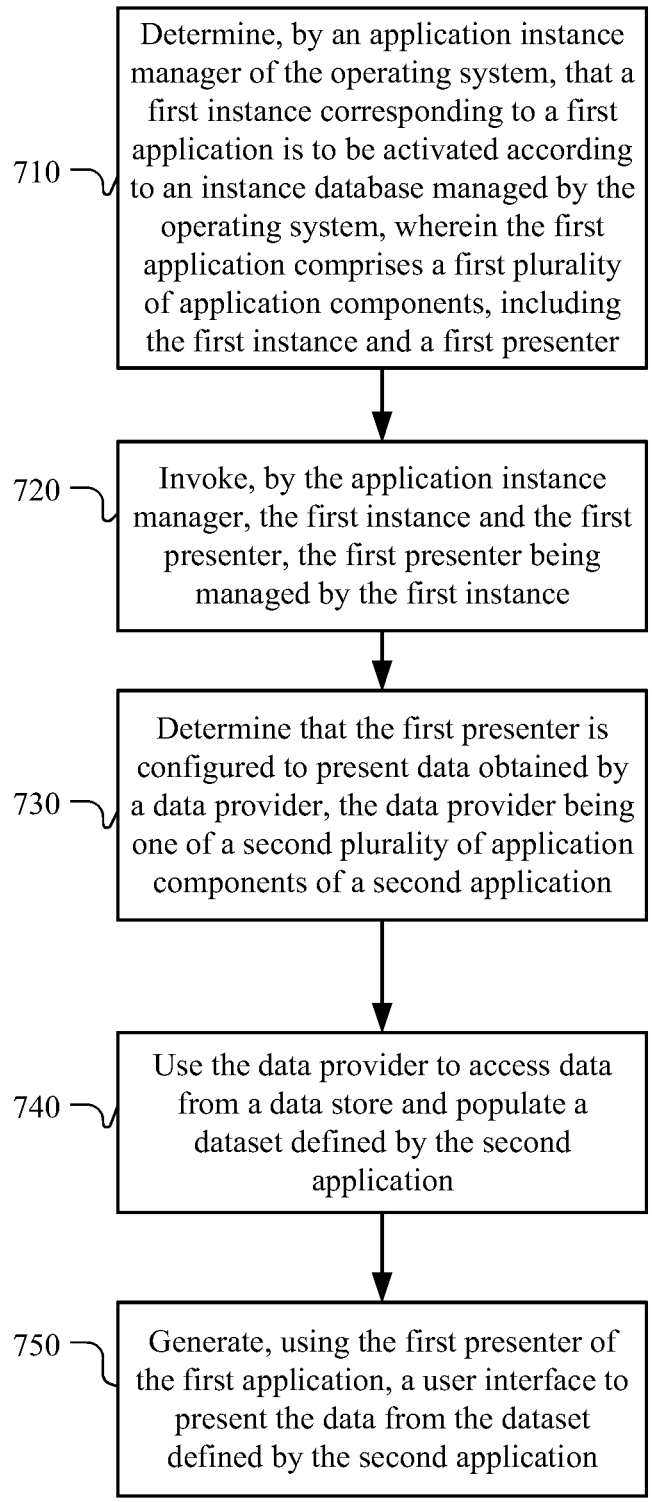
FIG. 7 illustrates an example method for implementing a decomposed application.

FIG. 7 illustrates an example method 700 for implementing a decomposed application. The method may begin at step 710, where an operating system on a computing system (e.g., augmented reality system or virtual reality system) may determine, by an application instance manager of the operating system, that a first instance corresponding to a first application is to be activated according to an instance database managed by the operating system. In particular embodiments, the first application may comprise a first plurality of application components, including the first instance and a first presenter. At step 720, the operating system of the computing system may invoke, by the application instance manager, the first instance and the first presenter. In particular embodiments, the first presenter may be managed by the first instance. At step 730, the operating system of the computing system may determine that the first presenter is configured to present data obtained by a data provider. In particular embodiments, the data provider may be one of a second plurality of application components of a second application. At step 740, the operating system of the computing system may use the data provider to access data from a data store and populate a dataset defined by the second application. At step 750, the operating system of the computing system may generate, using the first presenter of the first application, a user interface to present the data from the dataset defined by the second application. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for implementing a decomposed application, including the particular steps of the method of FIG. 7, this disclosure contemplates any suitable method of implementing a decomposed application, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
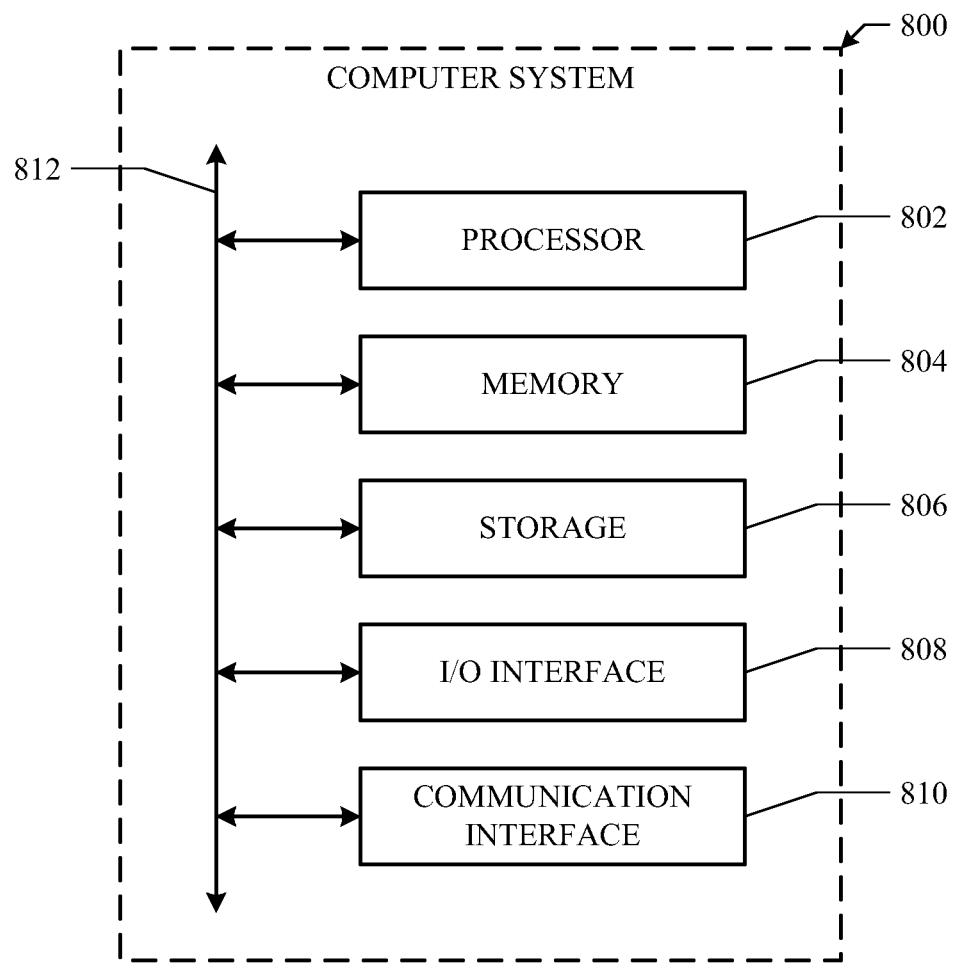
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an operating system of a computing system:
    determining, by an application instance manager of the operating system, that a first instance corresponding to a first application is to be activated according to an instance database managed by the operating system, wherein the first application comprises a first plurality of application components, including the first instance and a first presenter;

invoking, by the application instance manager, the first instance and the first presenter, the first presenter being managed by the first instance;

determining that the first presenter is configured to present data obtained by a data provider, the data provider being one of a second plurality of application components of a second application;

using the data provider to access data from a data store and populate a dataset defined by the second application; and generating, using the first presenter of the first application, a user interface to present the data from the dataset defined by the second application.

2. The method of claim 1, further comprising:

managing, using one or more other instances, one or more presenters to present data from one or more data providers in one or more user interfaces.

3. The method of claim 2, further comprising:

arranging, using a presentation manager, the one or more user interfaces based on predefined settings and user settings.

4. The method of claim 2, further comprising:

closing, using a presentation manager, one of the one or more user interfaces based on predefined settings and user settings.

5. The method of claim 1, further comprising:

determining, by the application instance manager, that a second instance corresponding to the second application is to be activated according to the instance database managed by the operating system; and invoking, by the application instance manager, the second instance and the data provider.

6. The method of claim 5, further comprising:

shutting down the second instance, wherein the data provider continues to run after the second instance shuts down.

7. The method of claim 1, further comprising:

using the data provider to access data from a second data store and populate the dataset defined by the second application.

8. One or more computer-readable non-transitory storage media embodying software that is operable when executed to:

determine, by an application instance manager of an operating system, that a first instance corresponding to a first application is to be activated according to an instance database managed by the operating system, wherein the first application comprises a first plurality of application components, including the first instance and a first presenter;

invoke, by the application instance manager, the first instance and the first presenter, the first presenter being managed by the first instance;

determine that the first presenter is configured to present data obtained by a data provider, the data provider being one of a second plurality of components of a second application;

using the data provider to access data from a data store and populate a dataset defined by the second application; and generate, using the first presenter of the first application, a user interface to present the data from the dataset defined by the second application.

9. The media of claim 8, wherein the one or more computer-readable non-transitory storage media is further operable when executed to:

manage, using one or more other instances, one or more presenters to present data from one or more data providers in one or more user interfaces.

10. The media of claim 9, wherein the one or more computer-readable non-transitory storage media is further operable when executed to:

arrange, using a presentation manager, the one or more user interfaces based on predefined settings and user settings.

11. The media of claim 9, wherein the one or more computer-readable non-transitory storage media is further operable when executed to:

close, using a presentation manager, one of the one or more user interfaces based on predefined settings and user settings.

12. The media of claim 8, wherein the one or more computer-readable non-transitory storage media is further operable when executed to:

determine, by the application instance manager, that a second instance corresponding to the second application is to be activated according to the instance database managed by the operating system; and invoke, by the application instance manager, the second instance and the data provider.

13. The media of claim 12, wherein the one or more computer-readable non-transitory storage media is further operable when executed to:

shut down the second instance, wherein the data provider continues to run after the second instance shuts down.

14. The media of claim 8, wherein the one or more computer-readable non-transitory storage media is further operable when executed to:

use the data provider to access data from a second data store and populate the dataset defined by the second application.

15. A system comprising:

one or more processors; and one or more computer-readable non-transitory storage media coupled to one or more of the processors and comprising instructions operable when executed by one or more of the processors to cause the system to:

determine, by an application instance manager of an operating system, that a first instance corresponding to a first application is to be activated according to an instance database managed by the operating system, wherein the first application comprises a first plurality of application components, including the first instance and a first presenter;

invoke, by the application instance manager, the first instance and the first presenter, the first presenter being managed by the first instance;

determine that the first presenter is configured to present data obtained by a data provider, the data provider being one of a second plurality of components of a second application;

using the data provider to access data from a data store and populate a dataset defined by the second application; and generate, using the first presenter of the first application, a user interface to present the data from the dataset defined by the second application.

16. The system of claim 15, wherein the instructions are further executable by the one or more processors to:

manage, using one or more other instances, one or more presenters to present data from one or more data providers in one or more user interfaces.

17. The system of claim 16, wherein the instructions are further executable by the one or more processors to:
  arrange, using a presentation manager, the one or more user interfaces based on predefined settings and user settings.

18. The system of claim 16, wherein the instructions are further executable by the one or more processors to:
  close, using a presentation manager, one of the one or more user interfaces based on predefined settings and user settings.

19. The system of claim 18, wherein the instructions are further executable by the one or more processors to:
  determine, by the application instance manager, that a second instance corresponding to the second application is to be activated according to the instance database managed by the operating system; and
  invoke, by the application instance manager, the second instance and the data provider.

20. The system of claim 19, wherein the instructions are further executable by the one or more processors to:
  shut down the second instance, wherein the data provider continues to run after the second instance shuts down.

\* \* \* \* \*